J. S. ORAM.
WINDLASS.
APPLICATION FILED AUG. 17, 1908.
954,332.
Patented Apr. 5, 1910.
2 SHEETS—SHEET 2.
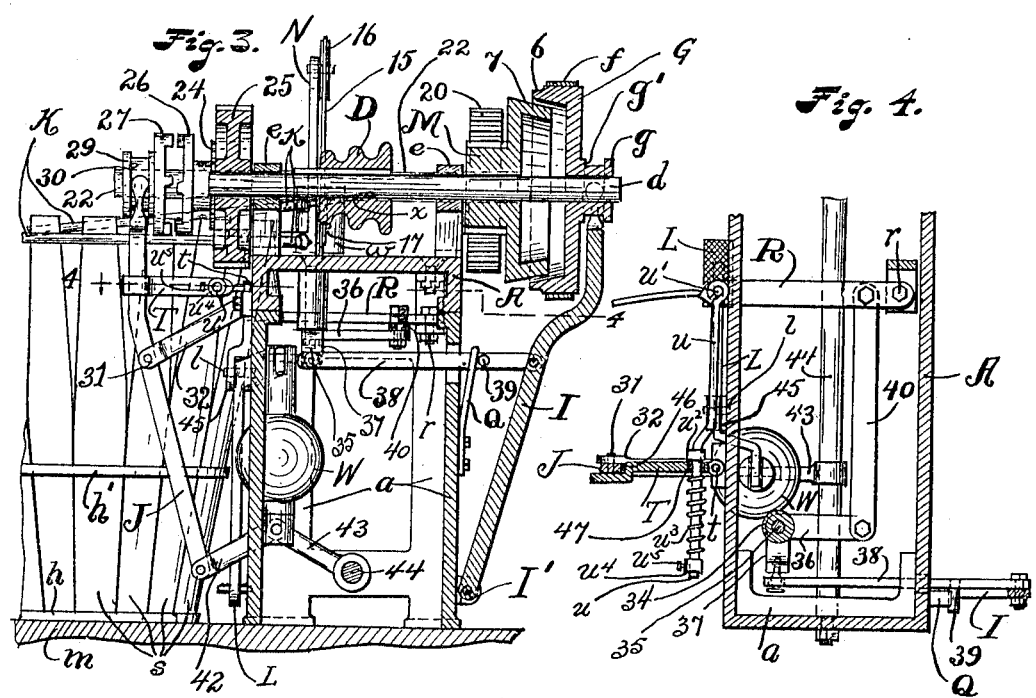
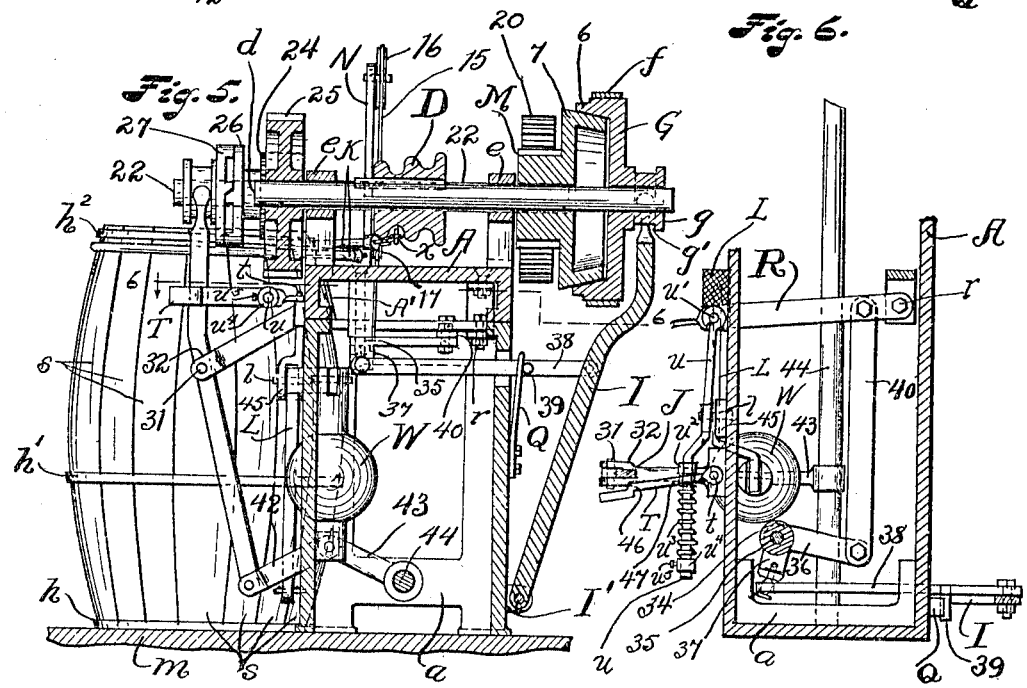
Witnesses:
H. J. Gettins
B. C. Brown
Inventor:
John S. Oram
By Mickoden
His Attorneys.

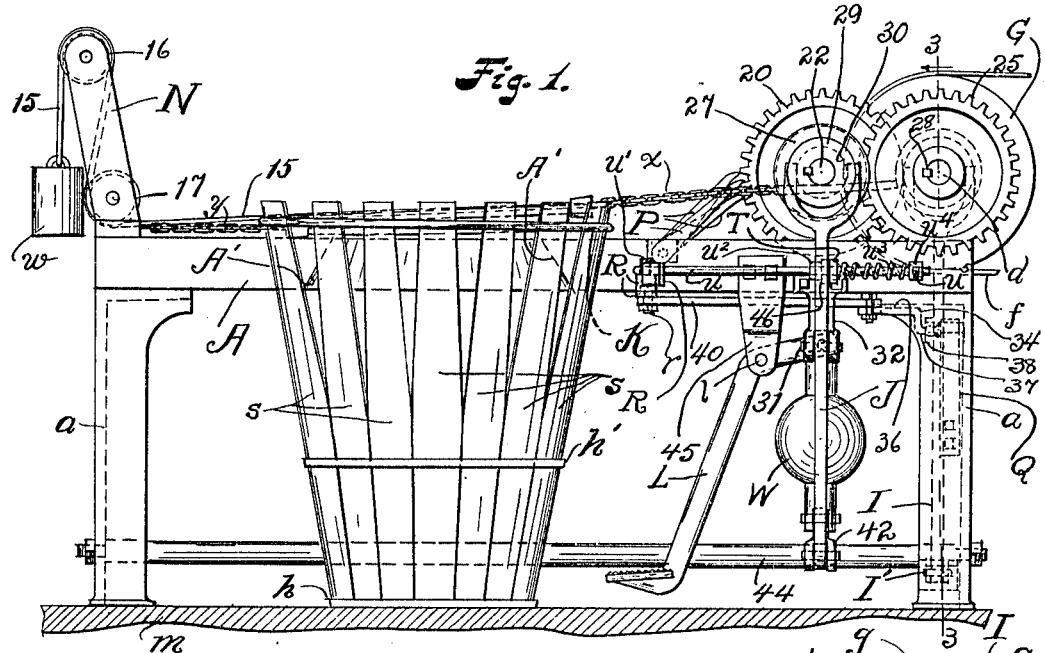
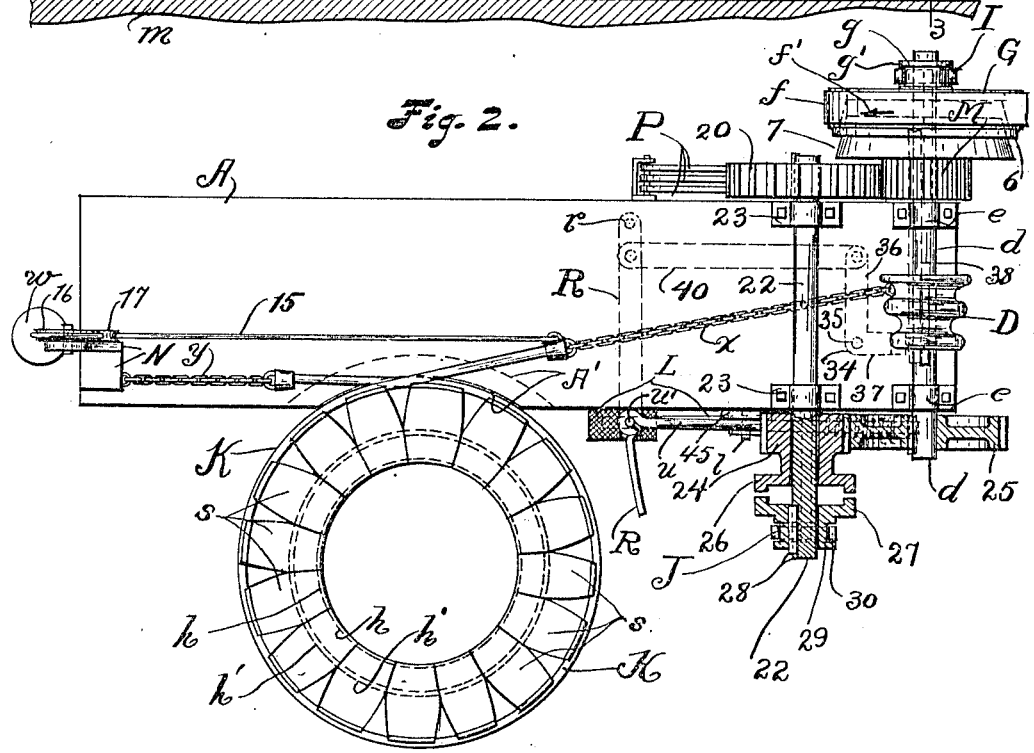

UNITED STATES PATENT OFFICE.

JOHN S. ORAM, OF CLEVELAND, OHIO.

WINDLASS.

954,332.  Specification of Letters Patent.  Patented Apr. 5, 1910.

Application filed August 17, 1908. Serial No. 448,812.

*To all whom it may concern:*

Be it known that I, JOHN S. ORAM, a citizen of the United States of America, residing at Cleveland, in the county of Cuyahoga and State of Ohio, have invented certain new and useful Improvements in Windlasses; and I hereby declare the following to be a full, clear, and exact description of the invention, such as will enable others skilled in the art to which it pertains to make and use the same.

This invention relates to improvements in windlasses more especially designed for the bending into the proper shape to form a barrel of a set of staves which are widest centrally between and gradually reduced in width toward their ends and assembled on end and placed tightly together within a hoop placed upon the floor.

This invention consists more especially in a windlass comprising the following:—a suitably supported shaft; a winding drum operatively mounted on the said shaft; a driving pulley operatively and loosely mounted on the said shaft a suitable distance from one end of the drum and provided at its inner end with one of the companion members of a clutch controlling operative connection between the pulley and a pinion which is loosely mounted on the said shaft between the pulley and the drum and provided at its outer end with the other member of the said clutch, which pulley is normally in its outer position in which the clutch-member borne by the pulley is held out of operative connection with the clutch-member borne by the pinion; means acting to retain the pulley in its outer position; lever-mechanism for shifting the pulley inwardly to establish operative connection between the aforesaid clutch-members; a spur-gear operatively mounted on the aforesaid shaft at the other end of the drum; another suitably supported shaft arranged parallel with the first-mentioned and drum-bearing shaft and operatively provided with a spur-gear which is in mesh with the aforesaid pinion; a pinion loosely mounted on the second-mentioned shaft and meshing with the spur-gear on the first-mentioned shaft and bearing one of the companion members of a clutch whose other member is operatively and slidably mounted on the second-mentioned shaft and normally held in its inoperative position against the action of means acting to move the said shiftable clutch-member into operative engagement with the companion and relatively stationary clutch-member; lever-mechanism for actuating the shiftable member of the last-mentioned clutch out of operative engagement with the other member of the said clutch against the action of the aforesaid means acting to retain the said shiftable clutch-member in its operative position; a latch for locking or retaining the last-mentioned lever-mechanism in position holding the connected clutch-member in its inoperative position, which latch is normally in its operative position; means whereby the said latch is rendered inoperative during the actuation of the first-mentioned lever-mechanism in establishing operative engagement between the companion members of the first-mentioned clutch; a chain or cable operatively connected with the winding drum and attached at one end to one end-portion of a rope or flexible band or member arranged to form a loop for surrounding the set of staves at the upper ends of the staves and movable across the other end-portion of the loop-forming member and drawn toward the drum during the actuation of the drum in the direction required to wind up the said chain or cable against the action of means acting to unwind the said chain or cable from the drum so that the loop is decreased in size during the rotation of the drum in the direction required to wind up the chain or cable as required to move the upper ends of the staves inwardly and thereby bend the staves to form a barrel, whereupon a hoop is placed around the barrel at the said ends of the staves to retain the latter in their bent form, and thereupon the drum is rendered free to rotate in the direction required to pay out chain or cable and thereby loosen the aforesaid loop-forming member relative to the staves as required to permit the removal of the said loop-forming member upwardly from the barrel after the application of the said hoop to the upper end of the barrel.

One object of this invention is to lock the shiftable member of the second-mentioned clutch in its inoperative position while the operation of the said clutch is not required and to prevent mutilation of the coacting portions of the companion members of the said clutch.

Another object is to render a windlass of the character indicated simple and durable in construction and exceedingly convenient, reliable and efficient in its operation.

With these objects in view, and to the end of realizing any other advantages hereinafter appearing, this invention consists in certain features of construction, and combinations of parts, hereinafter described, pointed out in the claims and illustrated in the accompanying drawings.

In the said drawings, Figure 1 is a front side elevation of a windlass embodying my invention. Fig. 2 is a top plan of the windlass, partly in section. Fig. 3 is a vertical section on line 3—3, Fig. 1, looking in the direction indicated by the arrow. Fig. 4 is a horizontal section on line 4—4, Fig. 3, looking downwardly. Fig. 5 is a vertical section corresponding with Fig. 3, except that in Fig. 5 the shiftable clutch-members of the two clutches of the windlass are shown thrown into operative engagement with the other and relatively stationary members of the said clutches. Fig. 6 is a horizontal section on line 6—6, Fig. 5, looking downwardly.

My improved windlass comprises a horizontally arranged rectangular or oblong bed-plate A which is mounted on and suitably secured to legs $a$ arranged under the ends of the bed-plate and resting on the floor $m$, as shown in Fig. 1.

A winding drum D is arranged horizontally over and transversely of one end-portion of the bed-plate A and operatively mounted on a correspondingly arranged shaft $d$. The shaft $d$ has bearing in two boxes $e$ and $e$ arranged at opposite ends respectively of the drum and supported from the bed-plate. On the shaft $d$ between the rear box $e$ and the rear or adjacent extremity of the shaft is loosely mounted a driving pulley G which is slidable endwise of the shaft and driven by a suitably applied belt $f$.

A friction-clutch for controlling operative connection between the pulley G and the shaft $d$ is provided. One member 6 of this clutch is formed on the pulley at the forward or inner end of the pulley, and the other member 7 of the clutch is formed on a pinion M which is loosely mounted on the shaft between the rear box $e$ and the pulley G preferably next the rear or outer end of the said box so that the latter prevents forward or inward displacement of the pinion. The pulley G is normally in its rear or outer position in which its clutch-member is out of operative engagement with the clutch-member 7 of the pinion. Obviously a shifting of the pulley G forwardly or inwardly establishes operative connection between the companion members 6 and 7 of the clutch and thereby operatively connects the pinion M with the pulley, and it will be observed therefore that the pulley, to interrupt operative connection between it and the pinion, is shifted outwardly. The pulley G is provided at its outer end with a hub which has an annular peripheral groove $g'$ engaged by an upright lever I for shifting the pulley, which lever I is therefore operatively connected at its upper end with the said hub and fulcrumed, as at I', at its lower end horizontally and at a right angle to the shaft $d$ to the adjacent leg $a$. Means for establishing operative connection between the pinion M and the shaft $d$ are provided as will hereinafter appear.

As already indicated, the drum D is arranged above the bed-plate at one end of the bed-plate. A suitably supported sheave-bearing bracket N is mounted on and rigidly secured to the bed-plate at the other end of the bed-plate. A rope or flexible band or member K is arranged between the bracket N and the drum D and preferably in the form of a loop and has its end-portions crossing each other and projecting toward the drum and bracket respectively. That end of the loop-forming member K which projects toward the bracket N is operatively attached to one end of a chain or cable $y$ which is fastened at its other end to the said bracket, and the said loop-forming member is attached at its opposite end to a chain or cable $x$ which leads to and is operatively connected with the drum D.

The loop-forming member K is arranged to encircle a set of staves $s$ placed in an upright position within a hoop $h$ which rests on the floor $m$ and are tightly fitted together at their side edges within the said hoop to form one end of the barrel to be formed. The staves are widest centrally between and gradually reduced in width toward their ends. Another hoop $h'$ encircles the set of staves at a distance above the floor equal to about one-third of the height of the barrel to be formed, which hoop is temporarily used to prevent falling apart of the staves preparatory to the surrounding of the set of staves at the upper end of the staves by the loop-forming member K.

The means employed in transmitting motion from the pinion M to the shaft $d$ comprises a spur-gear 20 which meshes with the said pinion and is operatively mounted on the rear end of a shaft 22 which is arranged horizontally and parallelly with the drum-bearing shaft $d$ between the latter and the loop-forming member K and over and transversely of the chain or cable $x$. The shaft 22 has bearing in two boxes 23 which are spaced transversely of and rigid with the bed-plate A. (See Fig. 2). A pinion 24 is loosely mounted on the shaft 22 next forward of the forward box 23 and meshes with a spur-gear 25 which is operatively mounted on the forward end of the drum-bearing shaft.

The shaft 22 extends a suitable distance forward of the pinion 24, and a clutch for controlling operative connection between the said pinion and the said shaft is provided. One member 26 of the said last-mentioned clutch is formed on the pinion 24 at the forward end of the pinion, and the other member 27 of the said clutch is operatively and slidably mounted on the shaft 22 forwardly of and normally out of operative engagement with the clutch-member 26. Preferably the companion clutch-members 26 and 27 are of the type having coacting projections and interdental spaces at their opposing faces. The operative connection between the clutch-member 27 and the shaft 22 is preferably by the well-known means of groove-and-feather, as at 28, Fig. 2. Obviously therefore a shifting of the movable clutch-member 27 inwardly or toward the pinion 24 establishes operative connection between the companion clutch-members 26 and 27 and thereby operatively connects the pinion with the shaft, and it will be observed that the movable clutch-member 27 to interrupt operative connection between it and the said pinion is shifted outwardly. The movable clutch-member 27 is provided at its outer end with a hub 29 which has an annular peripheral groove 30 engaged by an upright lever J for shifting the said clutch-member, which lever is operatively connected therefore with the said hub and fulcrumed, as at 31, centrally between its ends and horizontally and at a right angle to the shaft 22, to the outer end of a bracket 32 which is rigid with and projects forwardly from the bed-plate.

When the windlass is idle, as shown in Figs. 1, 2 and 3, the drum-engaging chain or cable $x$ is arranged to be wound on the drum and the pulley G and the clutch-member 27 are in their outer positions and out of operative connection with the pinion M. The pulley is rotated in the direction indicated by the arrow $f'$ placed on belt in Fig. 2, and the drum D, upon shifting the said pulley and the said clutch-member 27 inwardly to establish operative connection between the pulley and the drum, is rotated in the said direction and thereby winds up the drum-engaging chain or cable, and the winding up of the said chain or cable reduces the size of the loop formed by the loop-forming member K and bends the staves into the shape required to form the barrel, and when the staves have been moved inwardly at their upper ends far enough another hoop $h^2$ is placed around the upper end of the barrel being formed, as shown in Fig. 5, whereupon the loop-forming member is loosened relative to the barrel to permit its removal upwardly from the upper end of the barrel upon shifting the pulley and the clutch-member 27 out of operative connection with the pinions M and 24 respectively and permitting the rotation of the drum in the direction required to pay out the drum-engaging chain or cable by suitably applied means which acts to unwind the said chain or cable from the drum D and preferably comprises a weight $w$ suspended at the left-hand end of the bed-plate by a cable 15 which is attached at one end to the said weight and thence leads to and over a guide-sheave 16 supported from the upper end of the bracket N, thence to and under a guide-sheave 17 supported from the lower portion of the said bracket and thence to the chain or cable $x$ with which the cable 15 is operatively connected preferably substantially at the point at which the chain or cable $x$ is attached to the loop-forming member K.

It will be observed that the weight $w$ acts to draw the chain or cable $x$ toward the bracket N and consequently to pull the said chain or cable from the drum and to rotate the drum in the direction required to pay out the said chain or cable and to loosen the loop-forming member K relative to the upper end of the barrel formed by the said loop-forming member. Obviously therefore when the upper end of the barrel has been formed by the winding of the chain or cable $x$ on the drum and a hoop $h^2$ has been placed around the upper end of the barrel, as shown in Fig. 5, the operative connection between the pulley G and the pinion M and between the clutch-member 27 and the pinion 24 is interrupted to permit the said drum to rotate in the direction required to pay out the drum-engaging chain or cable, and obviously the drum when it has thus been rendered free to pay out the last-mentioned chain or cable will be rotated by the action of the weight $w$ in the direction required to pay out the said drum-engaging chain or cable and thereby loosen the loop-forming member K relative to the barrel to the extent required to permit the said loop-forming member to be removed upwardly from the barrel.

Pivotally supported pawls P are arranged at the left-hand side of the gear 20 and placed with their axes parallel with the said gear and project into interdental spaces of the said gear to prevent any return movement of the gear during the application of the hoop $h^2$ to the barrel upon arresting the rotation of the drum D in the direction required to wind up the engaging chain or cable $x$. I would also remark that the barrel being formed may in any approved manner be held or prevented from tipping. For instance, the bed-plate A may be provided at the front (see Fig. 1) with a bearing A' against which the barrel being formed may be shoved during the operation of the stave-bending member K, as shown in Fig. 5.

A bell-crank 34 is arranged horizontally under the right-hand end-portion of the bed-plate A from which it is suitably supported. The bell-crank 34 is fulcrumed vertically, as at 35, and placed with one arm 36 thereof projecting rearwardly and arranged transversely of the bed-plate and with its other arm 37 projecting toward the right-hand extremity and arranged longitudinally of the bed-plate. The said bell-crank is operatively connected at the outer end of its arm 37 by a rod or link 38 with the lever I about centrally between the ends of the said lever. The bell-crank is operatively connected at the outer end of its arm 36, by a rod or link 40 which is arranged under or longitudinally of the bed-plate, with a lever R which is arranged under and transversely of the bed-plate between the shaft 22 and the place at which the barrel is formed. The lever R projects a suitable distance forwardly of and is suitably supported from the bed-plate. The lever R is fulcrumed vertically at its rear end, as at $r$, and the rod or link 40 is attached to the said lever forwardly of the said fulcrum. The lever I, rod or link 38, bell-crank 34, rod or link 40 and lever R constitute lever-mechanism for actuating the pulley G inwardly to establish operative connection between the pulley and the pinion M. The rod or link 38 is provided between the lever I and the adjacent leg $a$ with a laterally projecting lug 39, and a suitably applied spring Q, which is supported from the said leg and arranged between the said leg and the said lug, engages the lug and acts to retain the lever-mechanism comprising the said rod or link in position holding the pulley G in its outer and normal position, so that the shifting of the said pulley to establish operative connection between it and the pinion M is against the action of the said spring, and obviously the lever R is actuated toward the right-hand end of the bed-plate,—that is, toward the drum D,—to establish operative connection between the pulley G and the pinion M against the action of the said spring. In Figs. 5 and 6 the lever I is shown actuated in the direction and to the extent required to establish operative connection between the pulley G and the pinion M.

The lever J is operatively attached at its lower end to the outer end of one link 42 of a toggle-joint which has its other link or member 43 journaled on a rod 44 which is arranged horizontally and parallelly with the fulcrum of the said lever and is instrumental in tying the legs $a$ together. The links or members 42 and 43 of the toggle-joint diverge downwardly and at the joint formed between them are operatively attached to the lower end of a weight W which acts to straighten the said members of the toggle-joint and hence to actuate the connected lever J in the direction required to shift the clutch-member 27 into operative engagement with the companion and relatively stationary clutch-member 26 and thereby establish operative connection between the pinion 24 and the shaft 22.

The weight W is operatively attached at its upper end with one arm of a foot-lever L which is fulcrumed, as at $l$, to a bracket 45 arranged between the levers J and R and rigid with the bed-plate A, and the other arm of the foot-lever extends to within convenient reach of the attendant. Obviously the actuation of the lever L in the direction required to raise the weight W will move the lever J in the direction required to shift the clutch-member 27 outwardly and out of operative engagement with the companion and relatively stationary clutch-member 26.

To avoid mutilation of the coacting projecting teeth or portions of the clutch-members 26 and 27 it is important to positively hold or lock the shiftable clutch-member 27 in its outer and inoperative position as long as operative connection between the pinion 24 and the shaft 22 is not required, and consequently a latch T is arranged forwardly of the bed-plate and pivoted vertically, as at $t$, to the bed-plate at a point rearwardly of the lever J. The latch T projects forwardly from the bed-plate and has a forwardly facing shoulder 46 which engages the rear side of the lever J in the outer position of the lever so that the shiftable clutch-member 27 is positively locked in its outer and inoperative position in the said position of the said lever. A rod $u$, which is arranged forwardly and longitudinally of the bed-plate A, is pivoted vertically at one end, as at $u'$, to the lever R and extends from the left-hand side of the latch T loosely through a slot 47 formed in the said latch (see Fig. 4) and a suitable distance beyond the right-hand side of the latch. The rod $u$ is provided at the left-hand side of the latch with a collar or member $u^2$ which abuts against the said side of the latch and thereby is in position to actuate the latch to the right and thereby render the latch inoperative during the movement of the rod in the said direction, and a spiral spring $u^3$ bears against the right-hand side of the latch and is mounted and confined on the rod between the latch and a collar $u^4$ adjustably mounted on the rod a suitable distance from the last-mentioned side of the latch. The collar $u^4$ is secured in the desired adjustment by a suitably applied set-screw $u^5$. It will be observed therefore that the latch T is operatively connected with the lever-mechanism employed in shifting the pulley G inwardly to establish operative connection between the pulley and the pinion M, and the arrangement of the parts is such that during the actuation of the said lever-mechanism to establish the said operative connection between the pulley and the said pinion the latch is actuated toward the right far enough to disengage its shoulder or surface 46 from the clutch-lever J and thereby permit the actuation of the said clutch-lever by the weight W in the direction required to establish operative connection between the shaft 22 and the pinion 24. In Figs. 5 and 6 the latch T is shown actuated into an inoperative position in which the shoulder or surface 46 of the latch is out of engagement with the clutch-lever J, and the latch abuts against the right-hand side of the said lever. By the construction described, it will be observed that normally the pinions 24 and M are out of operative connection with the shafts 22 and $d$ respectively; that the actuation of the lever R toward the right results in the shifting of the pulley inwardly to establish operative connection between the pulley and the pinion M and consequently between the pulley and the drum D; that during the said movement of the said lever the latch T is rendered inoperative so as to permit the weight W to actuate the shiftable clutch-member 27 into operative engagement with the companion and relatively stationary clutch-member 26 and thereby establish operative connection between the pinion 24 and the shaft 22 and consequently between the shaft 22 and the drum D; that the lever R is therefore actuated toward the right to effect the rotation of the drum in the direction required to wind up the engaging chain or cable $x$; that when the required amount of chain or cable $x$ has been wound upon the drum the lever R is released to interrupt operative connection between the pulley and the shaft $d$ whereupon the foot-lever L is actuated to elevate the weight W and thereby actuate the shiftable clutch-member 27 out of operative engagement with the companion and relatively stationary clutch-member 26 to interrupt operative connection between the pinion 24 and the shaft 22 so as to permit the unwinding of the cable or chain $x$ from the drum by the action of the weight $w$, but of course operative connection between the pinion 24 and the shaft 22 is not interrupted until the hoop $h^2$ has been applied to the upper end of the barrel. Obviously upon the actuation of the shiftable clutch-member 27 into its outer and normal position after the lever R has been released the latch T is actuated by the spring $u^3$ into its operative position to lock the said shiftable clutch-member in its inoperative position until the latch is rendered inoperative during the formation of the next barrel.

What I claim is:—

1. In a windlass, the combination, with a winding drum; a cable operatively connected with the drum; a shaft; a pinion loosely mounted on the shaft and operatively connected with the drum to transmit rotary motion to the drum; a clutch for controlling operative connection between the pinion and the shaft and having one of its members borne by the pinion and its other member operatively and slidably mounted on the shaft; a clutch-lever for shifting the last-mentioned clutch-member into its inoperative position, and means acting to retain the said clutch-lever in position holding the connected clutch-member in its operative position, of a movable latch which in its operative position locks the clutch-lever in position holding the last-mentioned clutch-member in its inoperative position; an endwise shiftable rod extending loosely and laterally through the latch, which rod is provided with a member arranged at one side of the latch and in position to actuate and thereby render the latch inoperative during the movement of the rod in one direction; a spiral spring mounted and confined on the rod at the other side of the latch and arranged to bear against the last-mentioned side of the latch, and means for actuating the rod endwise.

2. In a windlass, the combination, with a suitably supported winding drum; a cable operatively connected with the drum; a suitably supported shaft arranged laterally of and parallel with the drum; means for rotating the shaft; a pinion loosely mounted on the shaft and operatively connected with the drum to transmit rotary motion to the drum; a clutch for controlling operative connection between the pinion and the shaft and having one of its members borne by the pinion and its other member operatively and slidably mounted on the shaft; a suitably supported clutch-lever for shifting the last-mentioned clutch-member into its inoperative position, and means acting to retain the said clutch-lever in position holding the connected clutch-member in its operative position, of a suitably supported laterally movable latch which in its operative position locks the clutch-lever in position holding the last-mentioned clutch-member in its inoperative position; an endwise shiftable rod extending loosely and laterally through the latch, which rod is provided with a member arranged at one side of the latch and in position to actuate and thereby render the latch inoperative during the movement of the rod in one direction; a spiral spring mounted and confined on the rod at the other side of the latch and arranged to bear against the last-mentioned side of the latch, and means for actuating the rod endwise.

3. A windlass comprising a suitably supported shaft; a winding drum operatively mounted on the shaft; a pinion loosely mounted on the shaft and bearing one of the companion members of a clutch; a driving pulley loosely mounted on the shaft and bearing the other of the said companion members of the clutch, which pulley is normally in position holding its clutch-member out of operative engagement with the clutch-member of the pinion; lever-mechanism for actuating the pulley to bring the clutch-member of the pulley into operative engagement with the clutch-member of the pinion; means acting to hold the lever-mechanism in position retaining the pulley in its normal position; a cable operatively connected with the drum; another suitably supported shaft operatively provided with a gear arranged to receive motion from the aforesaid pinion; a pinion loosely mounted on the second-mentioned shaft and operatively connected with the drum-bearing shaft; a clutch for controlling operative connection between the last-mentioned pinion and the second-mentioned shaft and having one of its members borne by the said pinion and its other member operatively and slidably mounted on the said shaft; a suitably supported lever for shifting the last-mentioned clutch member into its inoperative position; means acting to retain the said clutch-lever in position holding the connected clutch-member in its operative position; a suitably supported movable latch which in its operative position locks the clutch-lever in position holding the last-mentioned clutch-member in its inoperative position, and means whereby the latch is rendered inoperative during the actuation of the aforesaid lever-mechanism in shifting the pulley to establish operative connection between the pulley and the first-mentioned pinion.

4. A windlass comprising a suitably supported shaft; a winding drum operatively mounted on the said shaft; a pinion loosely mounted on the shaft and bearing one of the companion members of a clutch; a spur-gear operatively mounted on the shaft; a driving pulley loosely mounted on the shaft and bearing the other of the said companion members of the clutch, which pulley is normally in position holding its clutch-member out of operative engagement with the clutch-member of the pinion; lever-mechanism for actuating the pulley to bring the clutch-member of the pulley into operative engagement with the clutch-member of the pinion; means acting to hold the said lever-mechanism in position retaining the pulley in its normal position; a cable operatively connected with the drum; a suitably supported shaft arranged laterally of and parallel with the first-mentioned shaft; a spur-gear operatively mounted on the second-mentioned shaft and meshing with the aforesaid pinion; means for preventing rotation of the last-mentioned gear in a direction opposite to the direction in which the said gear is rotated during the rotation of the pinion by the pulley; a pinion loosely mounted on the second-mentioned shaft and meshing with the gear on the drum-bearing shaft; a clutch for controlling operative connection between the last-mentioned pinion and the second-mentioned shaft and having one of its members borne by the said pinion and its other member operatively and slidably mounted on the said shaft; a suitably supported lever for shifting the last-mentioned clutch-member into its inoperative position; means acting to retain the said clutch-lever in position holding the connected clutch-member in its operative position; a suitably supported movable latch which in its operative position locks the clutch-lever in position holding the last-mentioned clutch-member in its inoperative position, and means whereby the latch is rendered inoperative during the actuation of the aforesaid lever-mechanism in shifting the pulley to establish operative connection between the pulley and the first-mentioned pinion.

5. A windlass comprising a suitably supported shaft; a winding drum operatively mounted on the shaft; a pinion loosely mounted on the shaft and bearing one of the companion members of a clutch; a driving pulley loosely mounted on the shaft and bearing the other of the said companion members of the clutch, which pulley is normally in position holding its clutch-member out of operative engagement with the clutch-member of the pinion; lever-mechanism for actuating the pulley to bring the clutch-member of the pulley into operative engagement with the clutch-member of the pinion; means acting to hold the lever-mechanism in position retaining the pulley in its normal position; a cable operatively connected with the drum; another suitably supported shaft operatively provided with a gear arranged to receive motion from the aforesaid pinion; a pinion loosely mounted on the second-mentioned shaft and operatively connected with the drum-bearing shaft; a clutch for controlling operative connection between the last-mentioned pinion and the second-mentioned shaft and having one of its members borne by the said pinion and its other member operatively and slidably mounted on the said shaft; a suitably supported lever for shifting the last-mentioned clutch-member into its inoperative position; means acting to retain the said clutch-lever in position holding the connected clutch-member in its operative position; a suitably supported laterally movable latch which in its operative position locks the clutch-lever in position holding the last-mentioned clutch-member in its inoperative position; an endwise shiftable rod operatively connected with the aforesaid lever-mechanism and having a member arranged at one side of the latch and in position to actuate and thereby render the latch inoperative during the movement of the rod in one direction, and a spiral spring mounted and confined on the rod at the other side of the latch and arranged to bear against the last-mentioned side of the latch.

In testimony whereof, I sign the foregoing specification, in the presence of two witnesses.

JOHN S. ORAM.

Witnesses:
C. H. DORER,
VICTOR C. LYNCH.